P. PATTERSON.
APPARATUS FOR THE MANUFACTURE OF TUBING.
APPLICATION FILED SEPT. 15, 1911.
1,155,677.
Patented Oct. 5, 1915.
3 SHEETS—SHEET 3.
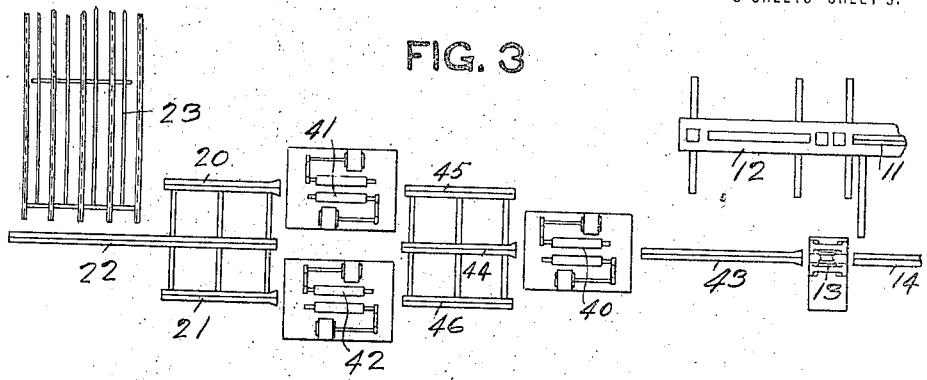
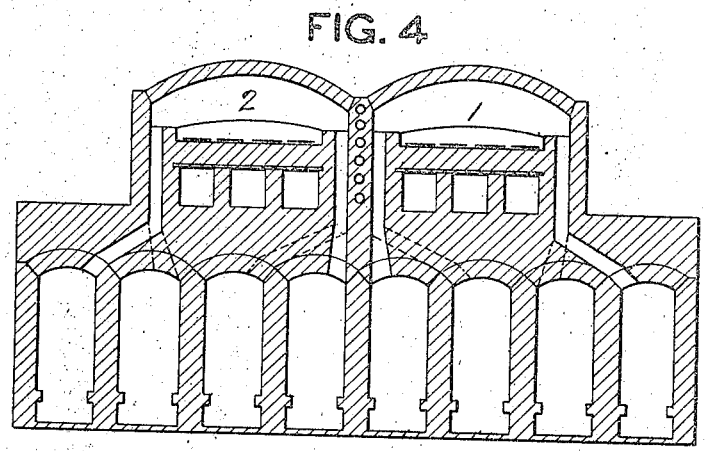
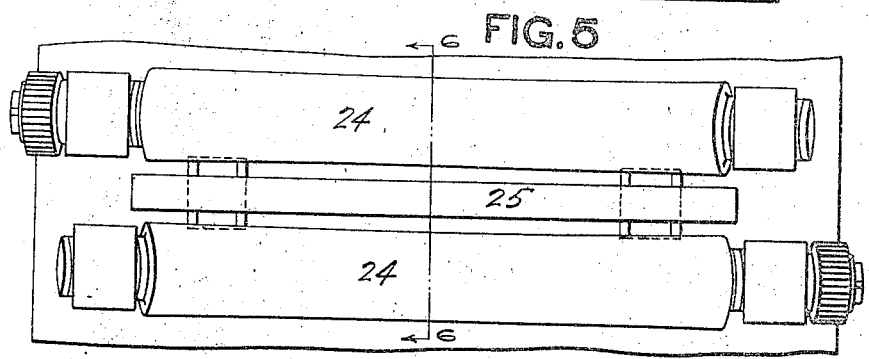
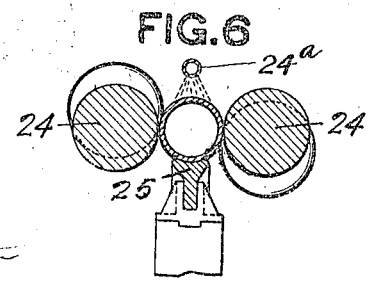
WITNESSES.
INVENTOR.

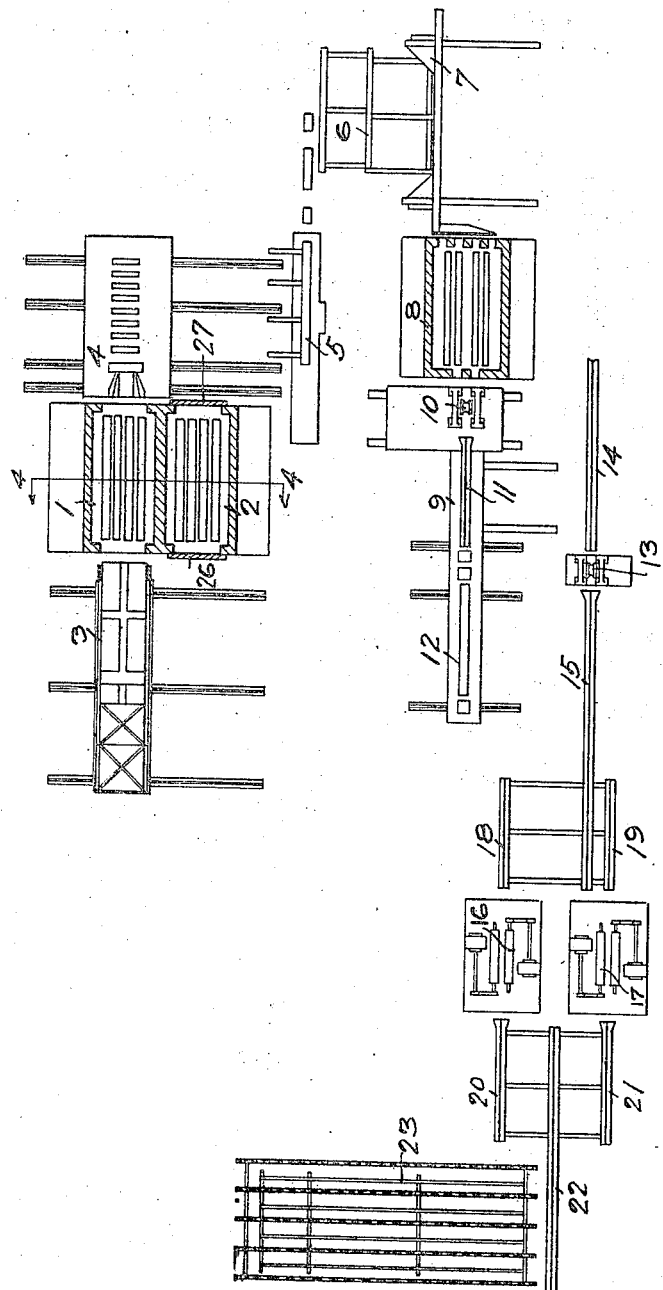

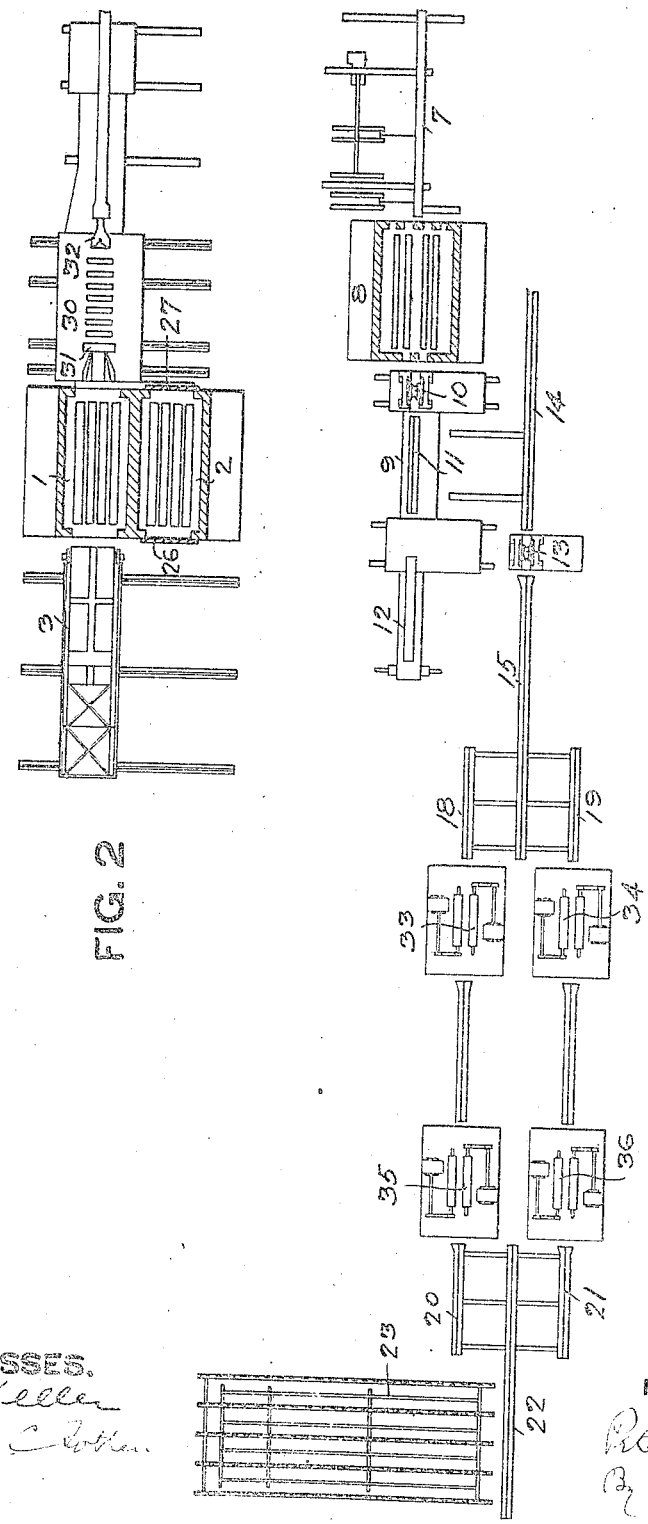

UNITED STATES PATENT OFFICE.

PETER PATTERSON, OF PITTSBURGH, PENNSYLVANIA; SAFE DEPOSIT AND TRUST COMPANY OF PITTSBURGH EXECUTOR OF SAID PATTERSON, DECEASED.

APPARATUS FOR THE MANUFACTURE OF TUBING.

1,155,677.  Specification of Letters Patent.  Patented Oct. 5, 1915.

Application filed September 15, 1911. Serial No. 649,460.

*To all whom it may concern:*

Be it known that I, PETER PATTERSON, a citizen of the United States, and resident of Pittsburgh, in the county of Allegheny and State of Pennsylvania, have invented a new and useful Improvement in Apparatus for the Manufacture of Tubing; and I do hereby declare the following to be a full, clear, and exact description thereof.

My invention relates to apparatus for the manufacture of tubing, its objects being to increase the output and the quality of the pipe, and to produce a larger proportion of first quality pipe; and to that end to provide apparatus for more uniform and rapid operation by providing a full supply of skelp for the welding furnaces, at a uniform heat, and to provide for the proper finishing of the pipe so as to deliver them to the threading machines in true cylindrical form and so do away with the necessity of the rounding of the pipe ends for threading, and yet care for all the pipe welded so that large outputs can be obtained, as well as to improve the apparatus in other ways.

To these ends my invention comprises apparatus for the manufacture of tubing including a double bending furnace, single feeding and bending apparatus operating therewith, a single welding furnace, a single feeding and welding apparatus operating therewith, and multiple cross roll finishing machines providing for the finishing of the welded pipe at a slow forward feed and yet taking care of all the pipe that can be produced in the welding furnaces, as well as allowing for increased production.

It also comprises certain other improvements as hereinafter more particularly set forth and claimed.

In the accompanying drawings Figure 1 is a plan view of the tube making apparatus embodying my invention; Fig. 2 is a like plan view of a modification of the apparatus; Fig. 3 is a plan view illustrating a modified arrangement of the cross roll finishing mechanism; Fig. 4 is a cross section of the preferred form of bending furnaces; Fig. 5 is an enlarged view of the finishing rolls; and Fig. 6 a cross section of the same.

One form of apparatus involving my invention is illustrated in Fig. 1 in which 1, 2, are the bending furnaces set side by side in which the skelp plates are heated, the drawing showing four plates on each hearth. 3 is the plate charging machine adapted to travel laterally across the front of the furnaces, and 4 is the scarfing machine also traveling laterally across the rear of the furnaces. 5 is the bending machine which can be of any desired form. The bending machine 5 delivers the skelp onto the rack 6 from which they are charged by the pusher 7 into the welding furnace 8. The welding machine 9 is illustrated as traveling laterally at the back of the welding furnace, which furnace is shown as having two ports, and is illustrated with two skelp resting in line with said ports so that they may be pushed into the rolls which are moved into line with the ports. The welding machine has the rolls 10 and the receiving trough 11 and bar puller 12. The sizing machine 13 at the side of the welding machine is formed of two concave rolls power driven, having the receiving trough 14 in front thereof, and the delivery trough 15 leading therefrom to the cross roll finishing machines. I employ two sets of finishing rolls 16, 17, having the feeding troughs 18 and 19 in front of them and the receiving troughs 20 and 21 in line with the finishing rolls, and between said receiving troughs the delivery trough 22 leading to the cooling table 23.

I prefer to provide the cross roll finishing machines with rolls of as great length as practicable, for example, as long as eighteen feet for large pipe, and they are made to feed the tubing through the same at a slow speed, practically at about one-half the speed now employed. For example, the travel of the pipe through the finishing rolls as now employed is about 5½ inches per revolution of the rolls, that speed being necessary to take care of the production of the welding furnace where only a single set of finishing rolls is employed. The finishing rolls as preferably employed in my invention operate at a longitudinal feed of the pipe of about 2 to 3 inches per revolution of the rolls, this being accomplished by the angular position or "set" of the rolls and by the concavity given thereto. As shown in the enlarged view Fig. 5, and the cross section Fig. 6 of the finishing rolls, each set is formed of two rolls 24 set diagonally and slightly concave, and between them is the pipe support 25, so located that as the pipe is rotated by the rolls it contacts with the surface of the support for the purpose hereinafter described.

In the use of the apparatus as illustrated in said figure the plates are charged into the two bending furnaces alternately, for example, four plates upon the hearth of each furnace, and in the regular operation as soon as one furnace is so charged the doors 26, 27, of that furnace are closed so that the plates therein are subjected to a high steady heat and all cooling of the furnace by the entrance of air through the doors prevented until the plates are brought up nearly to the temperature at which they are to be delivered from the furnace. Each furnace can be made much narrower than the single bending furnace now employed where the hearth is made wide enough to receive, say, six plates, and in this way I am enabled to increase the number of plates heated for bending into skelp by, say, one-third. By the employment of two furnaces, however, a higher heat can be maintained in each one because the hearth is narrower and the furnace can be operated to carry the flame and heat entirely across the hearth and to reheat the checker work of the regenerators, overcoming the necessity of forcing the furnace by a strong draft, and carrying a greater heat back into the furnace when it is reversed. A higher heat is thus generated because the flame and heat are not required to travel so great a distance over the hearth, while as the doors of the furnace can be kept closed for a much longer period, overcoming the sucking in of air through the same, a much higher and more uniform heat is produced and the plates in each furnace can be more quickly raised to the proper bending heat. After the plates are first charged into the bending furnace the doors of the furnace are closed while the plates are being withdrawn from the other bending furnace, the charging and scarfing, or scarfing and bending apparatus being moved laterally into line with the plate, and they are pushed from the furnace in the ordinary way. As soon as the plates have all been fed from that furnace, for example, from the furnace 1, the charging and scarfing mechanism is moved into line with the other furnace 2 and the plates fed therefrom as needed, the first furnace 1 being re-charged with plates and the doors closed, subjecting the plates in the furnace to the high heat thereof without disturbance by the entrance of air while the plates from the second furnace are being formed into skelp. In this way a full supply of skelp at a high uniform heat may be provided for the single welding furnace 3, being delivered on the rack 6 and carried down in proper position for feeding into the welding furnace by the pusher 7 and the skelp as so provided being at a higher heat than practicable where only a single bending furnace is employed; and therefore less time is required for bringing the same up to the proper welding heat in the welding furnace, thereby increasing the production of the furnace.

As the skelp are brought to the proper welding heat they are pushed out through the welding rolls of the welding machine onto the trough 11, the mandrel bar is withdrawn by the mandrel bar puller 12 and the pipe delivered laterally over into the trough 14 and then passed through the sizing machine 13 into the trough 15. They are carried along this trough and delivered alternately to the troughs 18 and 19 of the finishing rolls 16 and 17, each alternate pipe passing through the same set of finishing rolls into their receiving troughs 20 or 21, and being then delivered into the delivery trough 22 and thence to the cooling table. As each set of finishing rolls receives only each alternative pipe, and as these rolls are operated at a very slow speed, even though the apparatus is able to take care of all the pipe welded the pipe are subjected to prolonged cross roll finishing at slow forward feed, being cooled not only by the absorption of the heat from the pipe by the finishing rolls but by water cooling over their surfaces such as by the spray pipe 24$^a$ as shown in Fig. 6 so that in the prolonged cross roll finishing they are brought down to a low temperature, being first brought to true cylindrical shape and as held within said rolls until set, so that they are much below the temperature at which they would be liable to sag and lose shape when on the cooling table. In this slow cross roll finishing the surfaces of the pipe are carried continually over the pipe support of the finishing rolls and contact of the pipe surface with such pipe support is practically doubled because of the slow feed of the pipes through the finishing rolls, thus scraping off the scale from the pipe, forming smooth surfaces thereon free from scale and in fact largely polished. In this treatment the pipe are brought down to a temperature below the ordinary scaling heat, that is, to a temperature in the neighborhood of or below 1000° Fah. and the exposure of the smooth surfaces formed on the pipe, under the water cooling and the exposure to the atmosphere leads to the formation of a permanent oxid coating on the pipe which protects the same from rapid corrosion. In so operating I provide practically the same conditions as are present in the formation of polished sheet iron, the slow finishing leading to the scraping and removal from the bodies of the pipe of the scale formed by the high heat of the welding furnace, and absorbing the heat from the pipe in such a way that when it leaves the finishing rolls it is at the proper temperature for formation of such permanent oxid coating which is gradually formed thereon in the further cooling on the cooling table.

One pipe passing through the sizing rolls is fed into the trough 18 and passes through the finishing rolls 16 while the next pipe is fed into the trough 19 and passes through the finishing rolls 17, and thus the two sets of finishing rolls are acting on two different pipes at the same time, so that I am enabled to apply this prolonged cross-roll finishing at slow forward feed while taking care of as many pipe as are produced by the welding furnace, the racks between the trough leading from the sizing rolls and the troughs leading to the cross rolls providing storage, so that the welding and sizing may proceed even in case of delay in finishing. The slow cross roll finishing brings the pipe to such low heat that they are set, and as the pipe pass onto the cooling table they are not liable to bend or warp in the further cooling thereof, and they retain their true cylindrical form, and therefore it is unnecessary to subject them to the rounding-up treatment in the threading machines before being threaded, and the production from the threading machines is thereby very largely increased while better pipe is formed because the crystallizing action due to the cold rounding-up process is done away with.

I am thus enabled to obtain a much greater production because I am enabled to provide all the skelp that the welding furnaces can take care of and feed the skelp to the furnaces at a higher temperature, and I am enabled to roll finish the same so perfectly that practically none of the pipe will require a second heating and passage through the welding rolls on account of being out of round or crooked when delivered from the cooling table, and at the same time obtain the important advantage above set forth. I also obtain such advantages without extra labor cost, as no more labor is required either in the bending or finishing operations.

The apparatus illustrated in Fig. 1 is more particularly adapted for the forming of larger pipe, for example, pipe ten inches in diameter and larger. In Fig. 2 I have shown a plant for practicing the invention which is more particularly adapted for making smaller pipe where a larger number are made, the same parts illustrated in said Fig. 2 having the same reference numerals, and I will only refer to the mechanism as changed. For example, the carriage 30 is illustrated as carrying both the scarfing rolls 31 and the bending die 32, so that the scarfed plate passes longitudinally instead of laterally to the bending machine. The plant is provided with four sets of finishing rolls, for example, the rolls 33, 34, 35 and 36. The operation of this modified apparatus is practically the same as that above described, with the addition that each welded pipe passes through two sets of finishing rolls and is therefore subjected to more prolonged cross roll finishing, for example the pipe passing from the trough 15 alternately to the trough 18 and thence through the rolls 33, and thence in direct line through the finishing rolls 35, while the next pipe passes into the trough 19 and thence through the finishing rolls 34 and through the second set of finishing rolls 36. The apparatus is thus adapted to take care of a larger number of smaller sized pipe produced in the welding furnace, prolonged cooling action being obtained, or even a greater cooling action by such successive cross roll finishing and the pipe being held within the finishing rolls a sufficiently long time to insure their being set in true cylindrical shape.

Fig. 3 shows another variation in the arrangement of the plant, illustrating three sets of cross roll finishing machines, as shown at 40, 41 and 42. In this modification the welded pipe first passes through the sizing rolls 13 and into the trough 43, from which it passes directly through the finishing rolls 40, which may be driven at the full speed heretofore employed for this class of rolls. It then passes into the trough 44 and each alternative pipe passes to the trough 45 and through the finishing rolls 41, while the next pipe passes to the trough 46 and through the finishing rolls 42. In said rolls 41 and 42 the pipe is subjected to the prolonged cross roll finishing at slow speed above described, and thus held to true cylindrical shape until set, when it is delivered in the way above described to the cooling table.

In the different modifications of the cross roll finishing apparatus above illustrated, it is evident that I am enabled to cross-roll finish practically the same number of pipe at a very much lower forward feed through the cross rolls and without the pipe interfering with each other, and so am enabled not only to hold the pipe within the finishing machines until set in true cylindrical shape and sufficiently cool to prevent bending or warping the pipe in the further cooling on the cooling table, but by the slower forward feed per revolution within the finishing rolls to obtain a much greater contact with the surface of the heated pipe with the pipe supports in the finishing rolls and thus remove practically all scale from the pipe, providing a more perfect surface thereof, and practically polishing the pipe, and bring the pipe in passing from the finishing rolls to such low temperature that a permanent oxid is formed on its surface through the water used for cooling in the finishing rolls and subsequent exposure of the pipe on the cooling table.

The bending furnace illustrated in this application forms the subject of a separate application for patent filed of even date herewith, Serial No. 649,463. The arrangement of finishing rolls set in tandem as illustrated in Fig. 2 of this application also forms the subject matter of a separate application for patent filed of even date herewith, Serial No. 649,461.

What I claim is:

1. In apparatus for forming tubing, the combination of two bending furnaces, a single welding furnace and multiple finishing rolls and means to feed stock from said welding furnace to said rolls successively.

2. In apparatus for the manufacture of pipe, the combination of two bending furnaces side by side, single laterally moving charging and skelp forming apparatus adapted to coöperate alternately with each furnace, a single welding furnace, charging and welding apparatus coöperating therewith and multiple cross roll finishing machines and feeding and delivery mechanism coöperating therewith to feed the stock thereto successively.

3. In apparatus for the manufacture of pipe, the combination of two bending furnaces side by side, single laterally moving charging and scarfing apparatus adapted to coöperate with each furnace alternately, a single welding furnace, charging and welding apparatus coöperating therewith and multiple cross roll finishing machines and feeding and delivery mechanism coöperating therewith to feed the stock thereto successively.

4. In apparatus for the manufacture of tubing, the combination of two bending furnaces side by side, single laterally moving charging and bending apparatus coöperating therewith, a single welding furnace, charging and welding apparatus coöperating therewith, multiple cross roll finishing apparatus, and feeding and delivery mechanism coöperating therewith and adapted to feed the stock thereto successively.

5. In apparatus for the manufacture of tubing, the combination of two bending furnaces side by side, single laterally moving, charging and scarfing mechanisms adapted to coöperate therewith alternately, bending mechanism, a single welding furnace and charging and welding mechanism coöperating therewith.

6. In apparatus for the manufacture of tubing, the combination of two bending furnaces side by side, laterally moving charging and bending mechanism adapted to coöperate therewith alternately, a single welding furnace and charging and welding mechanism coöperating therewith.

7. In apparatus for the manufacture of tubing, the combination of a single welding furnace, welding mechanism coöperating therewith, multiple cross-roll finishing machines and trough connections between the welding mechanism and the finishing mechanism adapted to feed the stock to said finishing machines successively.

8. In apparatus for the manufacture of tubing, the combination of a single welding furnace, welding apparatus coöperating therewith, sizing rolls, multiple cross-roll finishing machines and trough connections between the welding furnace and the sizing rolls and between the latter and the multiple cross-roll finishing mechanism adapted to feed the stock to said finishing rolls successively.

9. In apparatus for the manufacture of tubing, the combination with a single welding furnace, welding mechanism coöperating therewith, multiple cross-roll finishing machines, a single trough leading to the finishing machines, and troughs in line with the finishing rolls parallel with the trough carrying the pipe to the finishing machines.

In testimony whereof, I the said PETER PATTERSON have hereunto set my hand.

PETER PATTERSON.

Witnesses:
ROBERT C. TOTTEN,
JOHN F. WILL.